(12) United States Patent
Varekamp et al.

(10) Patent No.: US 12,418,636 B2
(45) Date of Patent: Sep. 16, 2025

(54) CODING HYBRID MULTI-VIEW SENSOR CONFIGURATIONS

(71) Applicant: KONINKLIJKE PHILIPS N.V., Eindhoven (NL)

(72) Inventors: Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 44 days.

(21) Appl. No.: 18/290,838

(22) PCT Filed: Aug. 1, 2022

(86) PCT No.: PCT/EP2022/071492
§ 371 (c)(1),
(2) Date: Jan. 22, 2024

(87) PCT Pub. No.: WO2023/012083
PCT Pub. Date: Feb. 9, 2023

(65) Prior Publication Data
US 2024/0340398 A1 Oct. 10, 2024

(30) Foreign Application Priority Data
Aug. 6, 2021 (EP) .................................... 21190128

(51) Int. Cl.
*H04N 13/178* (2018.01)
*H04N 13/111* (2018.01)
(Continued)

(52) U.S. Cl.
CPC ......... *H04N 13/178* (2018.05); *H04N 13/111* (2018.05); *H04N 13/156* (2018.05);
(Continued)

(58) Field of Classification Search
CPC .. H04N 13/178; H04N 13/111; H04N 13/156; H04N 13/194; H04N 13/271;
(Continued)

(56) References Cited

U.S. PATENT DOCUMENTS

2012/0050264 A1  3/2012 Karaoguz
2012/0229602 A1  9/2012 Chen et al.
(Continued)

FOREIGN PATENT DOCUMENTS

| | | |
|---|---|---|
| EP | 2777267 A1 | 9/2014 |
| WO | 2009111007 A1 | 9/2009 |
| WO | 2020188148 A1 | 9/2020 |

OTHER PUBLICATIONS

International Search Report and Written Opinion from PCT/EP2022/07149 mailed Nov. 9, 2022.

*Primary Examiner* — Tung T Vo (57) ABSTRACT

A method for transmitting multi-view image frame data. The method comprises obtaining multi-view components representative of a scene generated from a plurality of sensors, wherein each multi-view component corresponds to a sensor and wherein at least one of the multi-view components includes a depth component and at least one of the multi-view components does not include a depth component. A virtual sensor pose is obtained for each sensor in a virtual scene, wherein the virtual scene is a virtual representation of the scene and wherein the virtual sensor pose is a virtual representation of the pose of the sensor in the scene when generating the corresponding multi-view component. Sensor parameter metadata is generated for the multi-view components, wherein the sensor parameter metadata contains extrinsic parameters for the multi-view components and the extrinsic parameters contain at least the virtual sensor pose of a sensor for each of the corresponding multi-view components. The extrinsic parameters enable the generation of (Continued)

additional depth components by warping the depth components based on their corresponding virtual sensor pose and a target position in the virtual scene. The multi-view components and the sensor parameter metadata is thus transmitted.

23 Claims, 3 Drawing Sheets (51) Int. Cl.
  *H04N 13/156*  (2018.01)
  *H04N 13/194*  (2018.01)
  *H04N 13/271*  (2018.01)
  *H04N 13/282*  (2018.01)
  *H04N 19/46*  (2014.01)

(52) U.S. Cl.
  CPC ......... *H04N 13/194* (2018.05); *H04N 13/271* (2018.05); *H04N 13/282* (2018.05); *H04N 19/46* (2014.11)

(58) Field of Classification Search
  CPC .... H04N 13/282; H04N 19/46; H04N 19/597; H04N 13/122; H04N 13/128; H04N 19/20; G06T 3/18; G06T 7/70
  USPC .................................................. 375/240.11
  See application file for complete search history.

(56) References Cited

U.S. PATENT DOCUMENTS

| | | | |
|---|---|---|---|
| 2013/0215220 A1* | 8/2013 | Wang | H04N 13/296 |
| | | | 348/E13.064 |
| 2014/0240469 A1 | 8/2014 | Lee | |
| 2015/0365646 A1* | 12/2015 | Bruls | H04N 13/156 |
| | | | 348/43 |
| 2016/0261844 A1 | 9/2016 | Kadambi et al. | |
| 2018/0268583 A1* | 9/2018 | Noh | H04N 19/182 |
| 2018/0359489 A1 | 12/2018 | Lakshman | |
| 2019/0139296 A1 | 5/2019 | Lakshman | |
| 2019/0320164 A1* | 10/2019 | Salahieh | H04N 13/156 |
| 2020/0066026 A1 | 2/2020 | Du et al. | |
| 2020/0106959 A1* | 4/2020 | Molina | H04N 23/698 |
| 2022/0345681 A1* | 10/2022 | Fleureau | H04N 13/161 |
| 2022/0377302 A1* | 11/2022 | Fleureau | H04N 13/161 |
| 2023/0124419 A1* | 4/2023 | Jeong | G06T 9/00 |
| | | | 382/232 |
| 2023/0353770 A1* | 11/2023 | Kang | H04N 19/70 |
| 2024/0185526 A1* | 6/2024 | Stehlik | H04N 13/351 |

* cited by examiner

CODING HYBRID MULTI-VIEW SENSOR CONFIGURATIONS

CROSS-REFERENCE TO PRIOR APPLICATIONS

This application is the U.S. National Phase application under 35 U.S.C. § 371 of International Application No. PCT/EP2022/071492, filed on Aug. 1, 2022, which claims the benefit of EP Patent Application No. EP 21190128.5, filed on Aug. 6, 2021. These applications are hereby incorporated by reference herein.

FIELD OF THE INVENTION

The invention relates to the field of multi-view image and video processing. In particular, the invention relates to the processing and rendering of multi-view image frame data and to the generation and decoding of multi-view metadata.

BACKGROUND OF THE INVENTION

Current multi-view immersive video formats that include depth maps typically assume that a depth map is associated with a physical or virtual camera for which texture information is also available. Both the multi-view video encoding algorithms and the rendering at the client side makes use of this assumption.

The likely cause of this historic choice of co-locating a texture map and a depth map is the process of multi-view depth estimation that results in a depth value per image pixel coordinate.

However, close-range or indoor setups benefit from high quality depth sensors based on time-of-flight or structured light. When color cameras are combined with these depth sensors, a hybrid sensor configuration results. Thus, there is a need to improve the encoding and decoding of multi-view image frame data from hybrid sensors.

EP 2777267 A2 discloses generating a depth map estimate and continuously updating it, thereby to enable the dependent various methods of inter-view redundancy reduction to be performed in a more efficient way than without having access to the depth map estimate.

US 2019/139296 A1 discloses a method for selecting sampled views of multiview images.

WO 2009/111007 A1 proposes a framework to use a virtual view as a reference view.

SUMMARY OF THE INVENTION

The invention is defined by the claims.

According to examples in accordance with an aspect of the invention, there is provided a method for transmitting multi-view image frame data, the method comprising:

obtaining multi-view components representative of a scene generated from a plurality of sensors, wherein each multi-view component corresponds to a sensor and wherein at least one of the multi-view components includes a depth component and at least one of the multi-view components does not include a depth component;

obtaining a virtual sensor pose for each sensor in a virtual scene, wherein the virtual scene is a virtual representation of the scene and wherein the virtual sensor pose is a virtual representation of the pose of the sensor in the scene when generating the corresponding multi-view component;

generating sensor parameter metadata for the multi-view components, wherein:
the sensor parameter metadata contains extrinsic parameters for the multi-view components, and
the extrinsic parameters contain at least the virtual sensor pose of a sensor for each of the corresponding multi-view components, thereby enabling the generation of additional depth components by warping the depth components based on their corresponding virtual sensor pose and a target position in the virtual scene; and transmitting the multi-view components and the sensor parameter metadata.

Conventionally, a multi-view component typically comprises a depth map (i.e. the depth component) and a corresponding texture image of the scene. During rendering of the multi-view components, it is usually assumed that the depth map is associated with a physical or virtual camera which also has an associated texture image. The rendering algorithm can thus make use of this assumption to render a multi-view image frame.

However, in some situations it may be advantageous to use camera sensors and depth sensors located at different positions in the scene. Alternatively or additionally, it may be advantageous to reduce the number of depth maps transmitted to a client device. Thus, the inventors propose to include the extrinsic parameters of the sensors (e.g. cameras and depth sensors) used to obtain the multi-view components (e.g. texture images and depth maps) in the metadata for the multi-view image frame data. According to embodiments of the present method a first sensor, associated with the at least one multi-view component that includes the depth component, has a different pose from a second sensor, associated with the at least one multi-view component that does not include a depth component. Therefore, the extrinsic parameters for these multi-view components are different.

The extrinsic parameters (including the pose of the sensor in the scene) allow the rendering algorithm to know from where each multi-view component was taken and is thus able to warp the depth map to a different target position.

An advantage of including the extrinsic parameters in the metadata for multi-view image frame data is that the amount of data in the bitstream can be reduced. This is due to the extrinsic parameters enabling the generation of additional depth components.

For example, if three texture images and three depth maps (e.g. generated by disparity estimation) are given for a particular scene, it may be possible to only include two of the depth maps in the bitstream as a third depth map can be generated from warping one or both of the other two depth maps.

In a second example, two color cameras may obtain two texture images without a depth component and a depth sensor may obtain a depth map. Due to the extrinsic parameters of the color cameras and the depth sensor being included in the metadata, the depth map can be mapped to the texture images at the client side (i.e. after decoding) instead of having to map the depth map to each texture image prior to encoding and transmitting.

The extrinsic parameters may also be known as external parameters or camera pose. The virtual sensor pose may contain the position and the orientation of the sensor in the virtual scene.

The target position may be, for example, the position corresponding to a multi-view component which does not include a depth component or a target viewpoint specified by a viewer.

In some examples, the different poses of the sensors may be partly the same. For example, some or all orientations of the sensors may be the same. If some or all positions of the sensors are the same, then all angles converge to a single point and the warping may be a "panoramic resampling".

The multi-view components may comprise one or more of: texture images of the scene; depth maps of the scene: infrared images of the scene: light projection images of the scene and virtual images of the scene.

In some examples, a depth map is the depth component of a multi-view component. However, a depth component is defined by data which provides depth information for the multi-view component and, thus, does not necessarily need to be a depth map. For example, a scalar value, a 3D mesh or an infra-red image could define the depth component of a multi-view component.

In other examples, a multi-view component is only a depth map.

At least one of the multi-view components may consist of a single depth component. The virtual sensor pose corresponding to said depth component may be different from the virtual sensor pose corresponding to any other multi-view component.

The virtual sensor pose of a first sensor may be defined relative to the virtual sensor pose of a reference sensor. For example, if one sensor is labelled as the "reference sensor" then all of the poses of the other sensors can be defined relative to the reference sensor. This avoids the need to define an arbitrary reference point in the virtual scene whilst ensuring the pose of all sensors is known in relation to reach other.

The method may further comprise grouping the multi-view components which correspond to the same, or partially the same, extrinsic parameters.

For example, all of the multi-view components obtained from a group of sensors at the same position (and any multi-view components generated therefrom) may be grouped together as they will have the same extrinsic parameters. Thus, the extrinsic parameters only have to be specified once in the metadata.

The sensor parameter metadata may further contain intrinsic parameters for the multi-view components, wherein the intrinsic parameters contain one or more of:
  a type of sensor used to generate a multi-view component;
  a model of the sensor used to generate a multi-view component;
  optical properties of the sensor used to generate a multi-view component, wherein the optical parameters comprise one or more of a focal length, an image sensor format, a principal point and distortion parameters; and
  operating parameters of a sensor used to generate a multi-view component.

The method may further comprise grouping multi-view components which correspond to the same, or partially the same, intrinsic parameters.

Similarly to the grouping step based on the extrinsic parameters, the multi-view components may be grouped on the intrinsic parameters. For example, multi-view components may be grouped on a particular model of sensor or on particular optical properties.

The sensor parameter metadata may further comprise instructions on which multi-view components to combine with each other during rendering of the multi-view image frame data.

For example, some complex objects may be partially obscured from certain angles and may thus need two depth maps to fully render the whole shape of the complex object.

The invention also provides a method for decoding a multi-view image frame data, the method comprising:
  receiving and decoding multi-view image frame data of a scene;
  obtaining multi-view components from the decoded multi-view image frame data, wherein at least one of the multi-view components includes a depth component and at least one of the multi-view components does not include a depth component;
  obtaining sensor parameter metadata for the multi-view components from the decoded multi-view image frame data, wherein:
    the sensor parameter metadata contains extrinsic parameters for the multi-view components,
    the extrinsic parameters contain a virtual sensor pose in a virtual scene for each of the corresponding multi-view components, and
    the virtual sensor pose is a virtual representation of the pose of a sensor used to generate the multi-view component:
  receiving a target viewpoint in the virtual scene; and
  generating additional depth components by warping one or more of the depth components to a different virtual sensor pose or the target viewpoint.

Obtaining the multi-view components of a scene may comprise receiving the multi-view components from a server or an encoder. Some (or all) of the depth components can be generated from the other, non-depth components via, for example, depth estimation at the decoder side.

Generating an additional depth component may comprise warping the depth component of a first multi-view component to the virtual sensor pose corresponding to a second multi-view component or warping the depth component of the first multi-view component to the target viewpoint, wherein the second multi-view component does not include a depth component.

A first multi-view component may be a depth map and a second multi-view component may be a texture image, wherein generating additional depth components comprises warping the depth map to the virtual sensor pose of the texture image, thereby generating a depth component for the texture image and warping the texture image with the depth component to the target viewpoint.

Alternatively, generating additional depth components may comprise warping the depth map to the target viewpoint thereby generating an additional depth map and projecting the additional depth map to the virtual sensor pose of the texture image.

The invention also provides a computer program product comprising computer program code which, when executed on a computing device having a processing system, cause the processing system to perform all of the steps of the afore-mentioned method for transmitting multi-view image frame data and/or the afore-mentioned method for decoding multi-view image frame data.

The invention also provides a processor configured to execute the computer program code.

The invention also provides a bitstream containing encoded multi-view image frame data depicting a scene, the bitstream comprising:
  a video bitstream, wherein the video bitstream has encoded in it a plurality of multi-view components, wherein at least one of the multi-view components includes a depth component and at least one of the multi-view components does not include a depth component; and a metadata bitstream comprising at least sensor parameter metadata for the multi-view components, wherein:
the sensor parameter metadata contains extrinsic parameters for the multi-view components; and
the extrinsic parameters contain a virtual sensor pose of a sensor for each of the corresponding multi-view components, thereby enabling the generation of additional depth components by warping the depth components based on their corresponding virtual sensor pose and a target position in the virtual scene.

The invention also provides a system for transmitting multi-view image frame data, wherein the system comprises a processor configured to:
obtain multi-view components representative of a scene generated from a plurality of sensors, wherein each multi-view component corresponds to a sensor and wherein at least one of the multi-view components includes a depth component and at least one of the multi-view components does not include a depth component;
obtain a virtual sensor pose for each sensor in a virtual scene, wherein the virtual scene is a virtual representation of the scene and wherein the virtual sensor pose is a virtual representation of the pose of the sensor in the scene when generating the corresponding multi-view component;
generate sensor parameter metadata for the multi-view components, wherein:
the sensor parameter metadata contains extrinsic parameters for the multi-view components, and
the extrinsic parameters contain at least the virtual sensor pose of a sensor for each of the corresponding multi-view components, thereby enabling the generation of additional depth components by warping the depth components based on their corresponding virtual sensor pose and a target position in the virtual scene; and
transmit the multi-view components and the sensor parameter metadata.

The system may further comprise the plurality of sensors.

The invention also provides a system for decoding a multi-view image frame data, wherein the system comprises a processor configured to:
receive and decode multi-view image frame data of a scene;
obtain multi-view components from the decoded multi-view image frame data, wherein at least one of the multi-view components includes a depth component and at least one of the multi-view components does not include a depth component;
obtain sensor parameter metadata for the multi-view components from the decoded multi-view image frame data, wherein:
the sensor parameter metadata contains extrinsic parameters for the multi-view components,
the extrinsic parameters contain a virtual sensor pose in a virtual scene for each of the corresponding multi-view components, and
the virtual sensor pose is a virtual representation of the pose of a sensor used to generate the multi-view component;
receive a target viewpoint in the virtual scene; and
generate additional depth components by warping one or more of the depth components to a different virtual sensor pose or the target viewpoint.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Embodiments of the invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for transmitting multi-view image frame data. The method comprises obtaining multi-view components representative of a scene generated from a plurality of sensors, wherein each multi-view component corresponds to a sensor and wherein at least one of the multi-view components includes a depth component and at least one of the multi-view components does not include a depth component. A virtual sensor pose is obtained for each sensor in a virtual scene, wherein the virtual scene is a virtual representation of the scene and wherein the virtual sensor pose is a virtual representation of the pose of the sensor in the scene when generating the corresponding multi-view component. Sensor parameter metadata is generated for the multi-view components, wherein the sensor parameter metadata contains extrinsic parameters for the multi-view components and the extrinsic parameters contain at least the virtual sensor pose of a sensor for each of the corresponding multi-view components. The extrinsic parameters enable the generation of additional depth components by warping the depth components based on their corresponding virtual sensor pose and a target position in the virtual scene. The multi-view components and the sensor parameter metadata is thus transmitted.

Figure 1:
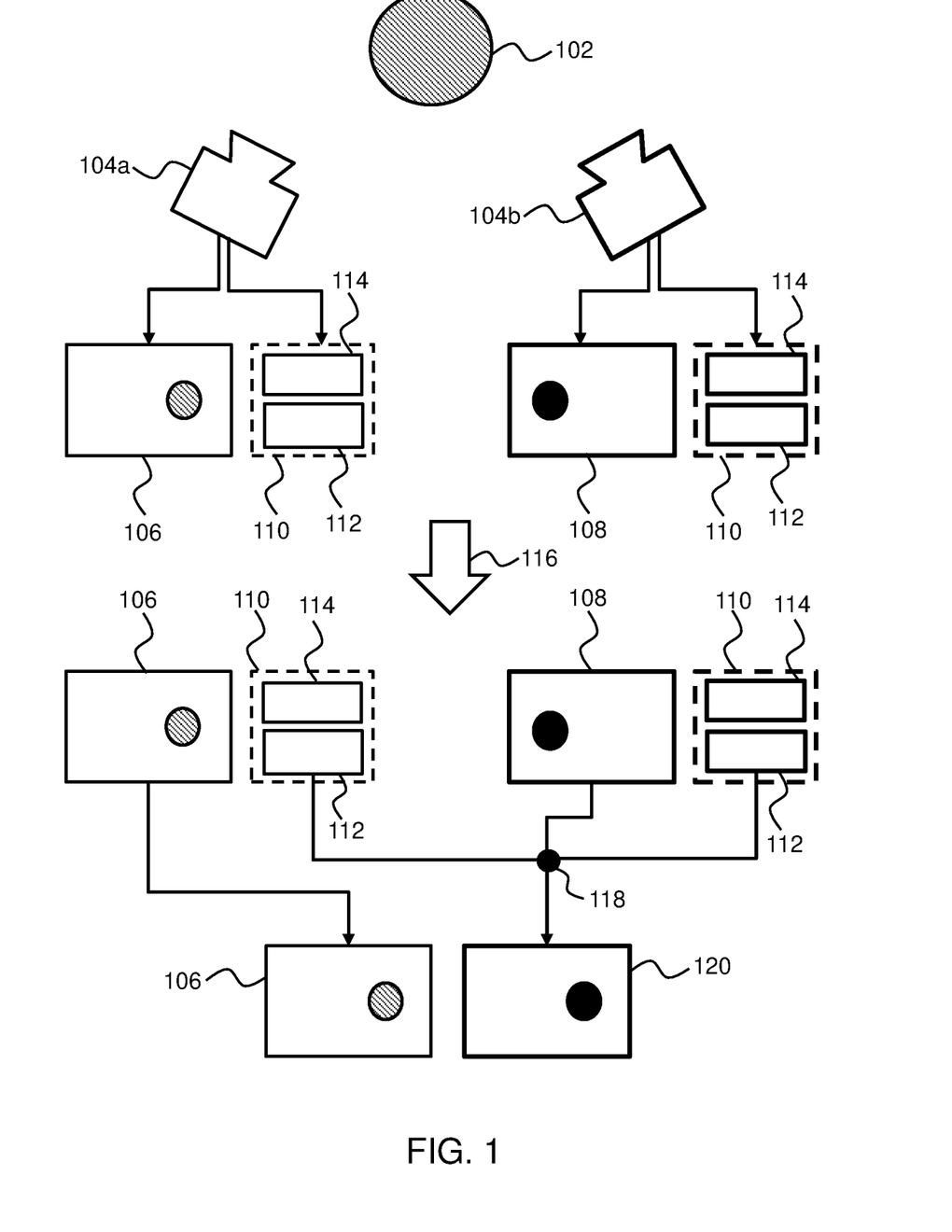
FIG. 1 shows the processing of data from two multi-view components according to one embodiment of the invention.

FIG. 1 shows the processing of data from two multi-view components 106 and 108 according to one embodiment of the invention. In this example, sensor 104*a* is a camera and sensor 104*b* is a depth sensor. Both the camera 104*a* and the depth sensor 104*b* are obtaining data for an object 102. Multi-view component 106 is generated by the camera 104*a* and, in this example, is a color image. There is no depth component in multi-view component 106. Multi-view component 108 is generated by the depth sensor 104b and, in this example, is a depth map. Multi-view component 108 is comprised of only a depth component (i.e. the depth map 108).

Conventionally, the depth map 108 would be warped to the camera's pose in order to create a depth map corresponding to the color image before the multi-view data is encoded and transmitted to a client or broadcast. However, this requires additional processing of the depth map 108 (i.e. warping to the pose of camera 104a) at the encoder. Additionally, if additional cameras 104a at different poses were included in the sensor configuration, the depth map 108 would have to be warped multiple times to the images 106 of each separate camera 104a which would increase the amount of data in the bitstream 116.

Instead, the inventors propose to encode sensor parameter metadata 110 and include it in the bitstream 116. The sensor parameter metadata 110 includes the extrinsic parameters 112 of the camera 104a for the image 106 and the extrinsic parameters 112 of the depth sensor 104b for the depth map 108. The extrinsic parameters 112 include the pose (i.e. position and orientation) of the corresponding sensor 104.

Including the extrinsic parameters 112 in the bitstream 116 enables the depth map 108 to be warped (at point 118) at the rendering stage once it has been received by the client. This further enables the amount of data in the bitstream 116 to be reduced, as only the single depth map 108 has to be included in the bitstream 116 and it can always be warped 118 to create additional depth maps 120 at different pose.

The bitstream 116 for multi-view image frame data will typically include a plurality or color images 106 taken with cameras 104a at different poses and a plurality of depth maps 108 taken with depth sensors 104b at different poses (or obtained via depth estimation from the color images 106). Thus, reducing the number of depth maps 108 needed for each multi-view frame will significantly reduce the amount of data in the bitstream 116. FIG. 1 only shows a single camera 104a and a single depth sensor 104b for the purposes of illustration: however, a plurality of color cameras 104a and/or depth sensors 104b may be used.

In FIG. 1, the intrinsic parameters 114 of the sensors 104 are also included in the sensor parameter metadata 110. For example, the intrinsic parameters 114 could include the type of sensor 104, the model of the sensor 104, the optical properties of the sensor 104 (e.g. the focal length, image sensor format, the principal point and distortion parameters) and the operating parameters of the sensor 104.

The sensor parameter metadata 110 includes, for example, the operating parameters used in a sensor/camera model to describe the mathematical relationship between the 3D coordinates of a point in the scene from which the light comes from and the 2D coordinates of its projection onto the image plane. The intrinsic parameters 114 (also known as internal parameters) are the parameters intrinsic to the sensor/camera itself, such as the focal length and lens distortion. The extrinsic parameters 112 (also known as external parameters or camera pose) are the parameters used to describe the transformation between the sensor/camera and its external world.

Figure 2:
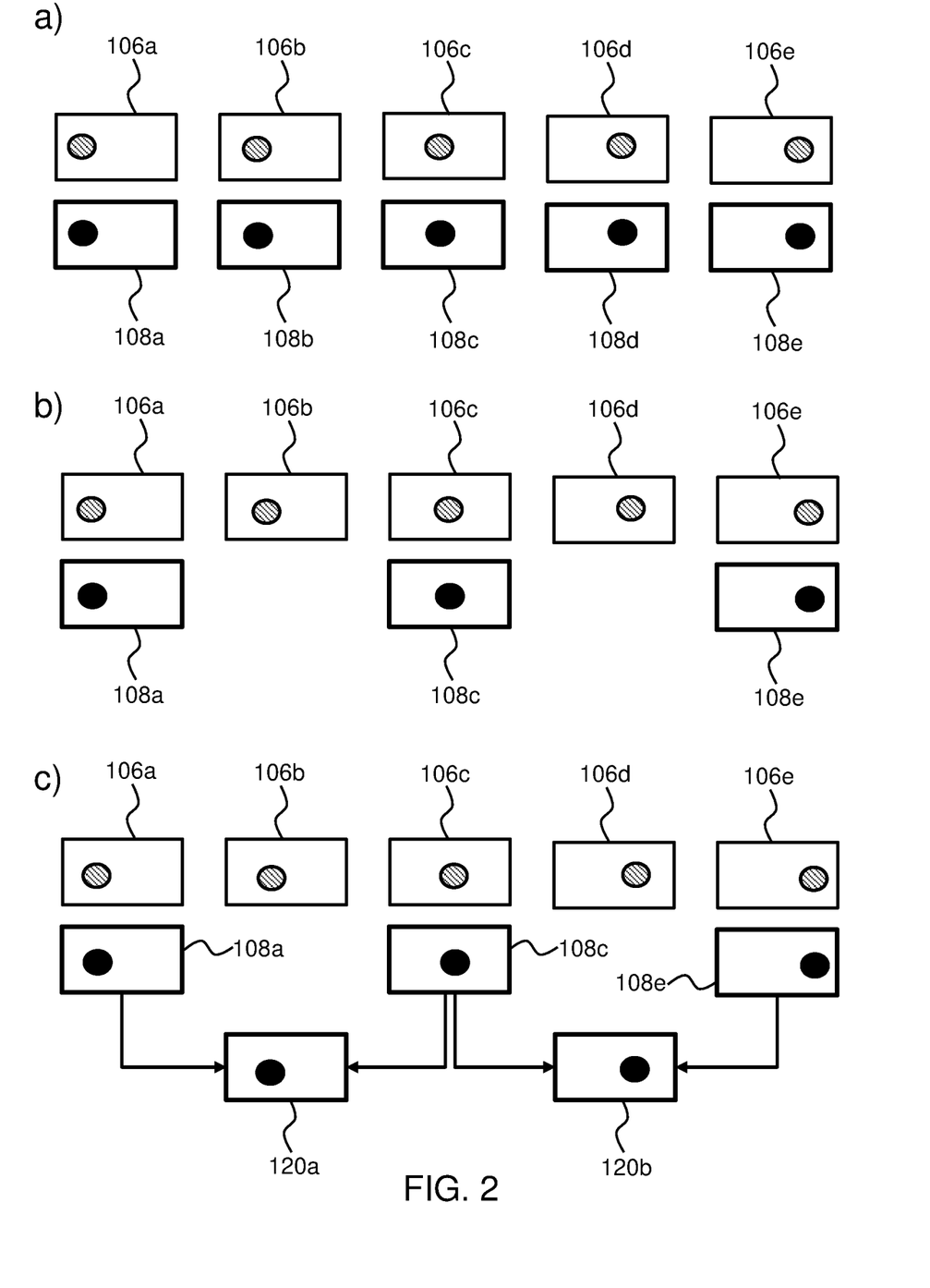
FIG. 2 shows an illustration of the data included in a video bitstream for a multi-view image frame.

FIG. 2 shows an illustration of the data included in a video bitstream for a multi-view image frame. FIG. 2 (a) shows a conventional video bitstream which includes five color images 106a to 106c and five corresponding depth maps 108a to 108e obtained via depth estimation.

FIG. 2 (b) shows a video bitstream produced according to an embodiment of the current invention. The video bitstream of FIG. 2 (b) includes the five color images 106a to 106e but only has three depth maps 108a, 108c and 108c. This shows a clear reduction in bitrate and pixel rate from the conventional video bitstream to the video bitstream according to the present embodiment.

For example, in order to arrive to the video bitstream of FIG. 2 (b), a subset of the depth maps 108a to 108e may be selected such that the inter-view distance between the selected depth maps is maximized whilst ensuring the selected depth maps include all the relevant information in the scene. In this example, the depth maps 108a to 108e correspond to the same (or similar) pose to that of the color images 106a to 106e. The selected depth maps 108a. 108c and 108e should fully cover a field of view of the scene (i.e. capture depth data for everything in the field of view). Thus, the depth maps 108 which, for example, capture depth data for objects or capture more scene complexity can be prioritized for selection over other depth maps 108 with less scene information.

The more depth maps 108 which are omitted from the selection, the more likely it is that aspects of the scene will be occluded in all of the remaining/selected depth maps. Thus the lower the number of selected depth maps 108 transmitted, the more likely for an image region in a color image 106 not to have corresponding depth data from any depth map 108. When depth data is missing, an inpainting technique may be employed to avoid rendering errors due to the missing depth information. However, inpainting requires predicting the pixel depth values of a depth map from incomplete data, and thus may sometimes output the wrong depth values (e.g. wrong depth values for complex objects).

In theory, all but one depth map 108 can be discarded (i.e. only one depth map selected). However, in practice, there is likely to be a balance (given a target bitrate) between removing one or more depth maps 108 (which may create a reduction in rendering quality due to occlusion problems) and adding one or more depth maps 108 (which adds additional data to the bitstream).

The occlusion problem caused by removing depth maps cannot be offset by, for example, changing quantization parameters during the encoding/compressing of the selected depth maps 108a. 108c and 108e. For example, increasing the quantization parameters (i.e. finer quantization) in compression can mitigate certain artefacts (e.g. noisy depth values), however, it cannot mitigate occlusion problems as there is no depth value to quantize. On the other hand, adding depth maps to the selected depth maps could increase the amount of data in the bitstream and, thus, may require a reduction of the quantization parameters (i.e. coarser quantization) during compression of the depth maps in order to reduce the amount of data transmitted of each depth map (e.g. such that all of the selected depth maps fit in the bitstream).

Alternatively, a new virtual depth component could be created prior to transmission. For example, the five captured depth maps 108a to 108e could be reduced to a single new depth anchor that has a position at the average position of the five sensors corresponding to the five depth maps 108a to 108c.

FIG. 2 (c) shows the generation of additional depth components (i.e. additional depth maps 120a and 120b) at the decoder side enabled by the inclusion of extrinsic parameters 112 (as shown in FIG. 1) in the metadata for the multi-view image frames. The additional depth maps 120a and 120b can be generated by warping one (or more) of the depth maps 108 to the pose corresponding to the color images 106b and 106d. Thus, the client (i.e. at decoder side) can render the multi-view image frame with five color images 108 and five depth maps 108 but only three out of the five depth maps 108 had to be encoded and transmitted.

Of course, the number of depth maps 108 transmitted to the client may depend on the maximum size of the bitstream and/or on the processing power of the client.

In the examples shown in FIGS. 1 and 2, the multi-view components have been obtained via cameras and depth sensors. However, more generally, the multi-view components could be obtained via a hybrid sensor configuration. For example, a hybrid sensor configuration could contain color cameras, infrared cameras, depth sensors (e.g. time-of-flight sensors, pattern sensors etc.), light projectors (e.g. infrared or visible light projector) and/or virtual versions of any of the aforementioned sensors.

Additionally, in FIGS. 1 and 2 the depth components have been shown as being depth maps 108. However, more generally, a depth component merely needs to contain some depth data for the scene (e.g. depth values for the object 102 in FIG. 1, depth value(s) for a background and/or depth value(s) for a foreground). For example, an infrared image that shows a projected pattern can be encoded and sent to client where a depth map can be generated. The extrinsic parameters 112 of the projector that generated the projected pattern would need to be encoded and transmitted in the sensor parameter metadata 110 (as shown in FIG. 1). Instructions on how to process/interpret the infrared pattern to calculate a depth map may also need to be included in the sensor parameter metadata 110.

Additionally, a 3D mesh could also be a depth component. The 3D mesh could be represented in world-space (scene) coordinates. The mesh could then be rendered to produce a depth map 108 for an arbitrary multi-view component with no depth component. The 3D mesh could also be represented relative to the pose of a virtual camera with associated extrinsic parameters.

In summary, the inventors propose to explicitly encode the extrinsic parameters of a hybrid sensor configuration where, for example, color cameras, depth sensors, infrared cameras and/or light projectors may all be represented with their own pose (position and orientation) information. Since data from the hybrid sensor configuration now lacks an implicit association of depth (i.e. the depth components) to each multi-view component (e.g. color images), this information is added as extrinsic parameters in the metadata. This further enables a reduction in data to be encoded (i.e. processed) and transmitted in the bitstream.

Metadata

FIGS. 1 and 2 mostly focus on use of extrinsic parameters 112 (FIG. 1) for the warping of depth components at the decoder. However, both intrinsic parameters 114 (FIG. 1) and extrinsic parameters 112 for the sensors 104 (FIG. 1) can be included in the sensor parameter metadata 110 (FIG. 1) to group the sensors 104. The parameters (intrinsic and extrinsic) can be specified for one or more sensors 104. For example, a set of parameters can be specified for:

A single sensor (e.g. a color camera, a depth sensor, a visible or infrared projector);

A group of sensors (e.g. one set of intrinsic and/or extrinsic parameters specified for a texture map, an infrared image, a depth map and a transparency map);

A group of sensors grouped on intrinsic parameters 114. For instance, all depth sensors of the same type (e.g. same brand/type) may have a single set of intrinsic parameters 114 describing the group. Within the group, parameter variation can be coded relative to a single reference: or A sensors relative to another sensor (e.g. relative to a reference sensor). This describes the inter-coding of extrinsic parameters 112. For example, the extrinsic parameters 112 may describe the pose of a pure depth sensor relative to a nearby color texture sensor.

Additionally, metadata may be added to specify which depth component(s) must be warped to which pose(s) during rendering (e.g. to pose(s) corresponding to multi-view component(s) with no depth component). For example, some complex objects may have a view-dependent (i.e. non-Lambertian) appearance such as a glossy or metallic surface and may thus need multiple texture maps (e.g. color image) to accurately render the object. The combination of multiple texture maps may be useful both at a frame (view) level and image section level. It may be that an entire texture map is comprised of complex objects or that a particular section of the texture map comprises complex object(s) and thus only the section needs to be rendered with multiple texture maps.

Rendering

Figure 3:
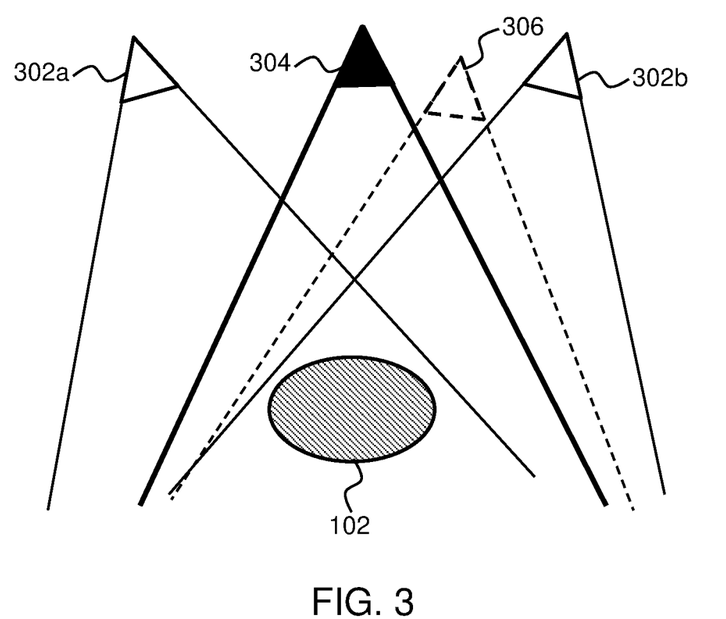
FIG. 3 shows a first example of the viewpoints of a hybrid sensor configuration.

FIG. 3 shows a first example of the viewpoints 302a, 302b and 304 of a hybrid sensor configuration. In this example, the hybrid sensor configuration contains two color cameras and a depth sensor. To render the multi-view components received from the hybrid sensor configuration, the depth map from the depth sensor is first warped from the viewpoint 304 of the depth sensor to the one or more viewpoints 302a and 302b of the color cameras, thus generating additional depth components.

Using the additional depth components, a second warp then brings the texture maps of the color cameras to a target viewpoint 306. At the target viewpoint 306, the various incoming textures may be blended. To determine the warp parameters, the extrinsic parameters of the depth sensor and color cameras are used. Thus, the depth map of the single depth sensor is used to synthesize new views at the target viewpoint 306 from the two color cameras.

Figure 4:
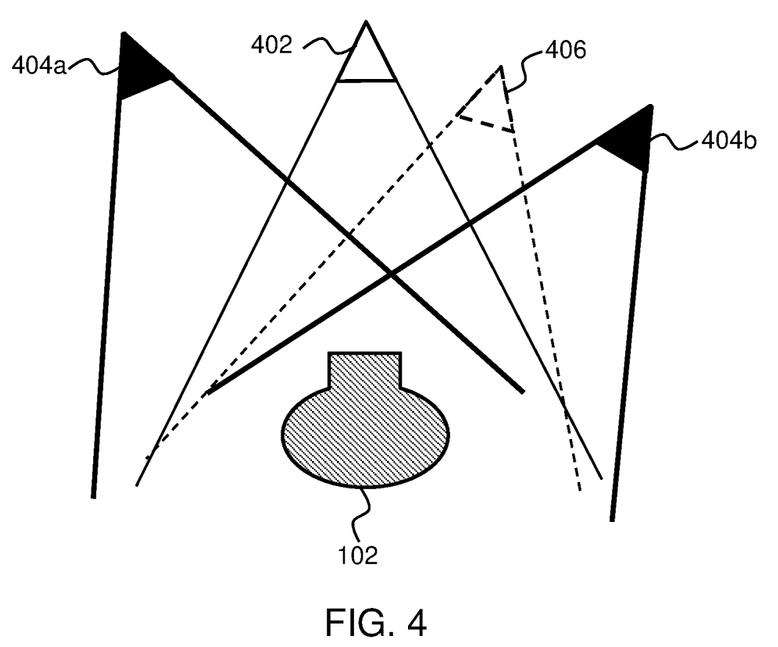
FIG. 4 shows a second example of the viewpoints of a hybrid sensor configuration.

FIG. 4 shows a second example of the viewpoints 402, 404a and 404b of a hybrid sensor configuration. In this example, the hybrid sensor configuration contains two depth sensors and a color camera. Because the geometry of the object 102 is more complex than the object 102 in FIG. 3, there is missing depth information in the depth map corresponding to viewpoint 404a. By adding a second depth sensor a viewpoint 404b, this problem is solved. Both depth maps are warped to viewpoint 402 and combined to create an additional depth map that can be used to warp the texture of the color camera to the target viewpoint 406.

An alternative method for rendering may comprise:
warping the depth component(s) directly to the target viewpoint 406, thereby generating additional depth component(s);
projecting the additional depth component(s) to the viewpoint 402 corresponding to the color camera;
storing the depth buffer of the projected additional depth component(s) with the color image;
blending depth values via a per pixel texture fetch;
evaluating the visibility of a color texture pixel in the target viewpoint 406 based on the depth buffer of the color image;
weighting the color of a pixel based on the resolution (e.g. shorter ray, smaller angle with normal etc.); and
weighing the color of a pixel based on the source visibility in the coordinate system of the color camera (e.g. via occlusion detection).

Evaluating the visibility of a color pixel may comprise warping the depth values in the depth buffer (corresponding to the viewpoint of the image of the color pixel) to the target viewpoint and identifying depth values which are covered by (non-transparent) pixels. The depth values which are covered in the target viewpoint correspond to non-visible color pixels in the color image.

This rendering method has the advantage that the depth map is only warped once (instead of multiple times) and the method should therefore have a lower sensitivity to depth errors.

Using this method, one or multiple depth maps are warped to the target viewpoint and the additional depth map generated can be used to "fetch" pixels from one or more texture images and combine/blend the color pixels from the texture images to produce a color image for the target viewpoint. This 'fetching' is essentially a lookup operation.

Fetching the texture/color from one or more color images may comprise a projection (i.e. no warping) whereby a projection comprises calculating where a ray from a 3D point (i.e. a 3D pixel of the additional/warped depth map) to the cardinal point of a camera (corresponding to a color image) intersects an image plane (i.e. the color image).

The 3D depth pixels of the additional depth map are thus projected onto the color pixel of the color image. This, in essence, assigns 3D depth pixel values to the color pixels of the color image. The value(s) of the 3D depth pixels projected onto a texture pixel can be stored in a depth buffer and, if more than one 3D depth pixel is projected onto a texture pixel, the depth values can be blended.

A depth buffer, also known as a z-buffer, is a type of data buffer used to represent depth information of objects in 3D space from a particular perspective.

However, a projection may not work if, from the perspective of the texture image, there is an object occluding one or more 3D points. The renderer thus needs to have a mechanism to detect this situation.

A possible solution is to independently warp the depth maps (from their original pose) to the texture image. This allows for the occlusion check. When there are multiple texture images available then blending can be applied based on depth ordering, resolution and ray angle considerations.

Note that, in this example, warping the depth maps to the texture image does not necessitate the warping of an already warped depth map, thus preventing cascading errors. The main purpose of the extra warp from depth maps to texture image is to be able to do a depth test for the occlusion check. However, the weighting of a color of a pixel (as discussed above) may depend on the depth test.

Warping may comprise applying a transformation to the depth map, wherein the transformation is based on the virtual sensor pose of the depth map and a known target position in the virtual scene. For example, the transformation may be based on the difference between the virtual sensor pose of the depth map and the known target position. When referring to warping, it should be understood that forward warping and/or inverse (backwards) warping could be used. In forward warping, source pixels are processed in scanline order and the results are projected onto the target image. In backward warping, the target pixels are inversely mapped in raster order to the source image and sampled accordingly.

Possible warping approaches include using points, using a regular mesh (i.e. predefined size and topology) and/or using an irregular mesh.

For example, using points may comprise using a depth map (for each given pixel) from a first viewpoint (i.e. view A) to calculate the corresponding location in a second viewpoint (i.e. view B) and fetching the pixel location from view B back to view A (i.e. an inverse warp).

Alternatively, for example, using points may comprise using the depth map (for each given pixel) of view A to calculate the corresponding pixel location in view B and mapping the pixel location from view A to view B (i.e. a forward warp).

Using a regular mesh (e.g. two triangles per pixel, two triangles per 2×2 pixels, two triangles per 4×4 pixels etc.) may comprise calculating 3D mesh coordinates from the depth map in view A and texture mapping data from view A to view B.

Using an irregular mesh may comprise generating a mesh topology for view A based on the depth map (and, optionally, texture and/or transparency data in view A) and texture mapping the data from view A to view B.

The skilled person would be readily capable of developing a processor for carrying out any herein described method. Thus, each step of a flow chart may represent a different action performed by a processor, and may be performed by a respective module of the processing processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:
obtaining multi-view components representative of a scene,
wherein the multi-view components are generated from a plurality of sensors,
wherein each multi-view component corresponds to one sensor of the plurality of sensors,
wherein at least one of the multi-view components comprises a first depth component, and
wherein at least one of the multi-view components does not comprise a depth component;
obtaining a virtual sensor pose for each sensor of the plurality of sensors in a virtual scene,
wherein the virtual scene is a virtual representation of the scene,
wherein the virtual sensor pose is a virtual representation of the position and orientation of the sensor in the scene when generating the corresponding multi-view component;
generating sensor parameter metadata for the multi-view components,
wherein the sensor parameter metadata comprises extrinsic parameters for the multi-view components,
wherein the extrinsic parameters comprise the virtual sensor pose of a sensor for each of the corresponding multi-view components;
enabling the generation of at least one second depth components by warping the first depth component based on the virtual sensor pose and a target position in the virtual scene; and
transmitting the multi-view components and the sensor parameter metadata.

2. The method of claim 1,
wherein the multi-view components is selected from the group consisting of texture images of the scene, depth maps of the scene, infrared images of the scene, light projection images of the scene and virtual images of the scene.

3. The method of claim 1,
wherein at least one of the multi-view components comprises only of a depth component,
wherein the virtual sensor pose corresponding to the depth component is different from the virtual sensor pose corresponding to any other multi-view component.

4. The method of claim 1, wherein the virtual sensor pose of a first sensor is defined relative to the virtual sensor pose of a reference sensor.

5. The method of claim 1, further comprising grouping the multi-view components which correspond to the same, or partially the same, extrinsic parameters.

6. The method of claim 1,
wherein the sensor parameter metadata comprises intrinsic parameters of for the multi-view components,
wherein a multi-view sensor generated a multi-view component,
wherein the intrinsic parameters are selected from the group consisting of a type of the multi-view sensor, a model of the multi-view sensor, optical properties of the multi-view sensor, and operating parameters of the multi-view sensor,
wherein the optical parameters are selected from the group consisting of a focal length, an image sensor format, a principal point and distortion parameters.

7. The method of claim 1,
wherein the sensor parameter metadata comprises instructions,
wherein the instructions arrange which multi-view components to combine with each other during rendering of a multi-view image frame data.

8. A computer program stored on a non-transitory medium, wherein the computer program when executed on a processor performs the method as claimed in claim 1.

9. A method comprising:
receiving multi-view image frame data of a scene;
decoding the multi-view image frame data of the scene;
obtaining multi-view components from the decoded multi-view image frame data,
wherein at least one of the multi-view components comprises a first depth component, and
wherein at least one of the multi-view components does not comprise a depth component;
obtaining sensor parameter metadata for the multi-view components from the decoded multi-view image frame data,
wherein the sensor parameter metadata comprises extrinsic parameters for the multi-view components,
wherein the extrinsic parameters comprise a virtual sensor pose in a virtual scene for each of the corresponding multi-view components,
wherein the virtual sensor pose is a virtual representation of the position and orientation of a sensor,
wherein the multi-view component is based on the virtual representation of the position and orientation of the sensor;
receiving a target viewpoint in the virtual scene; and
generating at least one second depth components by warping the first depth component to a different virtual sensor pose or the target viewpoint.

10. The method of claim 9,
wherein the generating of an additional depth component comprises warping the depth component of a first multi-view component to the virtual sensor pose corresponding to a second multi-view component,
wherein the second multi-view component does not comprise a depth component.

11. The method of claim 9,
wherein a first multi-view component is a depth map,
wherein a second multi-view component is a texture image,
wherein generating the least one second depth components comprises:
warping the depth map to the virtual sensor pose of the texture image so as to generate a depth component for the texture image; and
warping the texture image with the depth component to the target viewpoint.

12. The method of claim 9,
wherein a first multi-view component is a depth map,
wherein a second multi-view component is a texture image,
wherein generating the at least one second depth components comprises:
warping the depth map to the target viewpoint so as to generate an additional depth map;
projecting the additional depth map to the virtual sensor pose of the texture image of the second component so as to generate a depth buffer for the texture image of the second component; and
evaluating the visibility of at least one texture pixels based on the depth buffer of the texture image, wherein the at least one texture pixels corresponds to the texture image from the target viewpoint.

13. The method of claim 9,
wherein generating an additional depth component comprises warping the depth component of the first multi-view component to the target viewpoint,
wherein the second multi-view component does not comprise a depth component.

14. A computer program stored on a non-transitory medium, wherein the computer program when executed on a processor performs the method as claimed in claim 9.

15. An apparatus comprising:
a processor circuit and a memory circuit, wherein the memory is arranged to store instructions for the processor circuit,
   wherein the processor circuit is arranged to obtain multi-view components representative of a scene,
      wherein the multi-view components are generated from a plurality of sensors,
      wherein each multi-view component corresponds to one sensor of the plurality of sensors,
      wherein at least one of the multi-view components comprises a depth component,
      wherein at least one of the multi-view components does not comprise a depth component;
   wherein the processor circuit is arranged to obtain a virtual sensor pose for each sensor of the plurality of sensors in a virtual scene,
      wherein the virtual scene is a virtual representation of the scene,
      wherein the virtual sensor pose is a virtual representation of the position and orientation of the sensor in the scene when generating the corresponding multi-view component;
   wherein the processor circuit is arranged to generate sensor parameter metadata for the multi-view components,
      wherein the sensor parameter metadata comprises extrinsic parameters for the multi-view components,
      wherein the extrinsic parameters comprise at least the virtual sensor pose of a sensor for each of the corresponding multi-view components;
   wherein the processor circuit is arranged to enable the generation of at least one second depth components by warping the first depth component based on the virtual sensor pose and a target position in the virtual scene; and
   wherein the processor circuit is arranged to transmit the multi-view components and the sensor parameter metadata.

16. The apparatus of claim 15,
wherein at least one of the multi-view components comprises only of a depth component,
wherein the virtual sensor pose corresponding to the depth component is different from the virtual sensor pose corresponding to any other multi-view component.

17. The apparatus of claim 15, wherein the virtual sensor pose of a first sensor is defined relative to the virtual sensor pose of a reference sensor.

18. The apparatus of claim 15, wherein the processor circuit is arrange to group the multi-view components which correspond to the same, or partially the same, extrinsic parameters.

19. An apparatus comprising:
a processor circuit and a memory circuit, wherein the memory is arranged to store instructions for the processor circuit,
   wherein the processor circuit is arranged to receive multi-view image frame data of a scene;
   wherein the processor circuit is arranged to decode the multi-view image frame data of the scene;
   wherein the processor circuit is arranged to obtain multi-view components from the decoded multi-view image frame data,
      wherein at least one of the multi-view components comprises a first depth component,
      wherein at least one of the multi-view components does not comprise a depth component;
   wherein the processor circuit is arranged to obtain sensor parameter metadata for the multi-view components from the decoded multi-view image frame data,
      wherein the sensor parameter metadata comprises extrinsic parameters for the multi-view components,
      wherein the extrinsic parameters comprise a virtual sensor pose in a virtual scene for each of the corresponding multi-view components, and
      wherein the virtual sensor pose is a virtual representation of the position and orientation of a sensor,
      wherein the multi-view component is based on the virtual representation of the position and orientation of the sensor;
   wherein the processor circuit is arranged to receive a target viewpoint in the virtual scene; and
   wherein the processor circuit is arranged to generate at least one second depth components by warping at least one of the first depth component to a different virtual sensor pose or the target viewpoint.

20. The apparatus of claim 19,
wherein the generating of an additional depth component comprises warping the depth component of a first multi-view component to the virtual sensor pose corresponding to a second multi-view component,
wherein the second multi-view component does not comprise a depth component.

21. The apparatus of claim 19,
wherein the generating of an additional depth component comprises warping the depth component of the first multi-view component to the target viewpoint,
wherein the second multi-view component does not comprise a depth component.

22. The apparatus of claim 19,
wherein a first multi-view component is a depth map,
wherein a second multi-view component is a texture image,
wherein generating the least one second depth components comprises:
   warping the depth map to the virtual sensor pose of the texture image so as to generate a depth component for the texture image; and
   warping the texture image with the depth component to the target viewpoint.

23. The apparatus of claim 19,
wherein a first multi-view component is a depth map,
wherein a second multi-view component is a texture image,
wherein generating the at least one second depth components comprises:
   warping the depth map to the target viewpoint so as to generate an additional depth map;
   projecting the additional depth map to the virtual sensor pose of the texture image of the second component so as to generate a depth buffer for the texture image of the second component; and evaluating the visibility of at least one texture pixels based on the depth buffer of the texture image, wherein the at least one texture pixels corresponds to the texture image from the target viewpoint.

* * * * *